July 4, 1944.　　　　　M. COHEN ET AL　　　　　2,352,617
METHOD OF TREATING DOUGH
Filed Feb. 6, 1942　　　　2 Sheets-Sheet 1
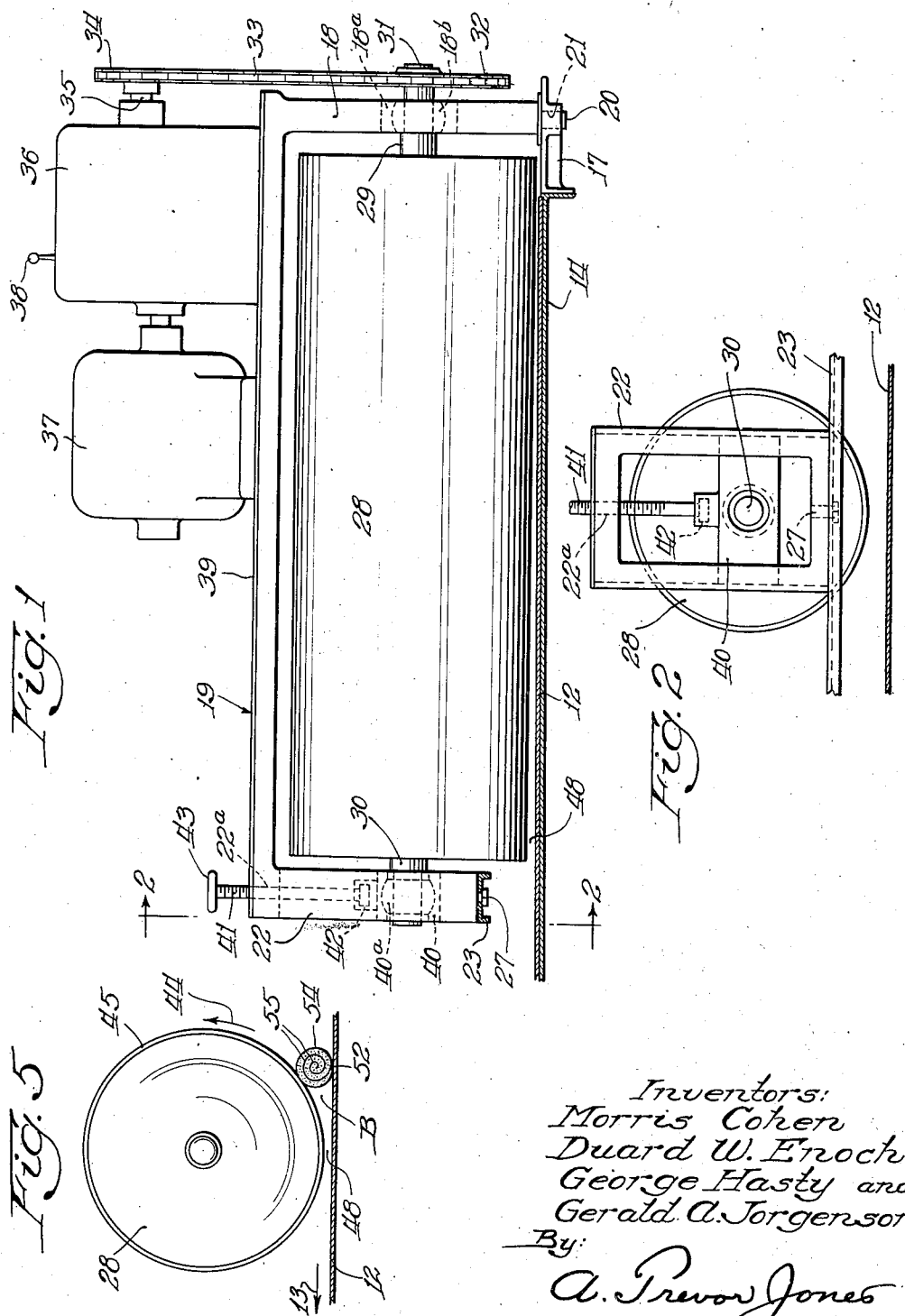
Inventors:
Morris Cohen
Duard W. Enoch
George Hasty and
Gerald A. Jorgenson
By: A. Trevor Jones
Atty July 4, 1944.   M. COHEN ET AL   2,352,617
METHOD OF TREATING DOUGH
Filed Feb. 6, 1942   2 Sheets-Sheet 2
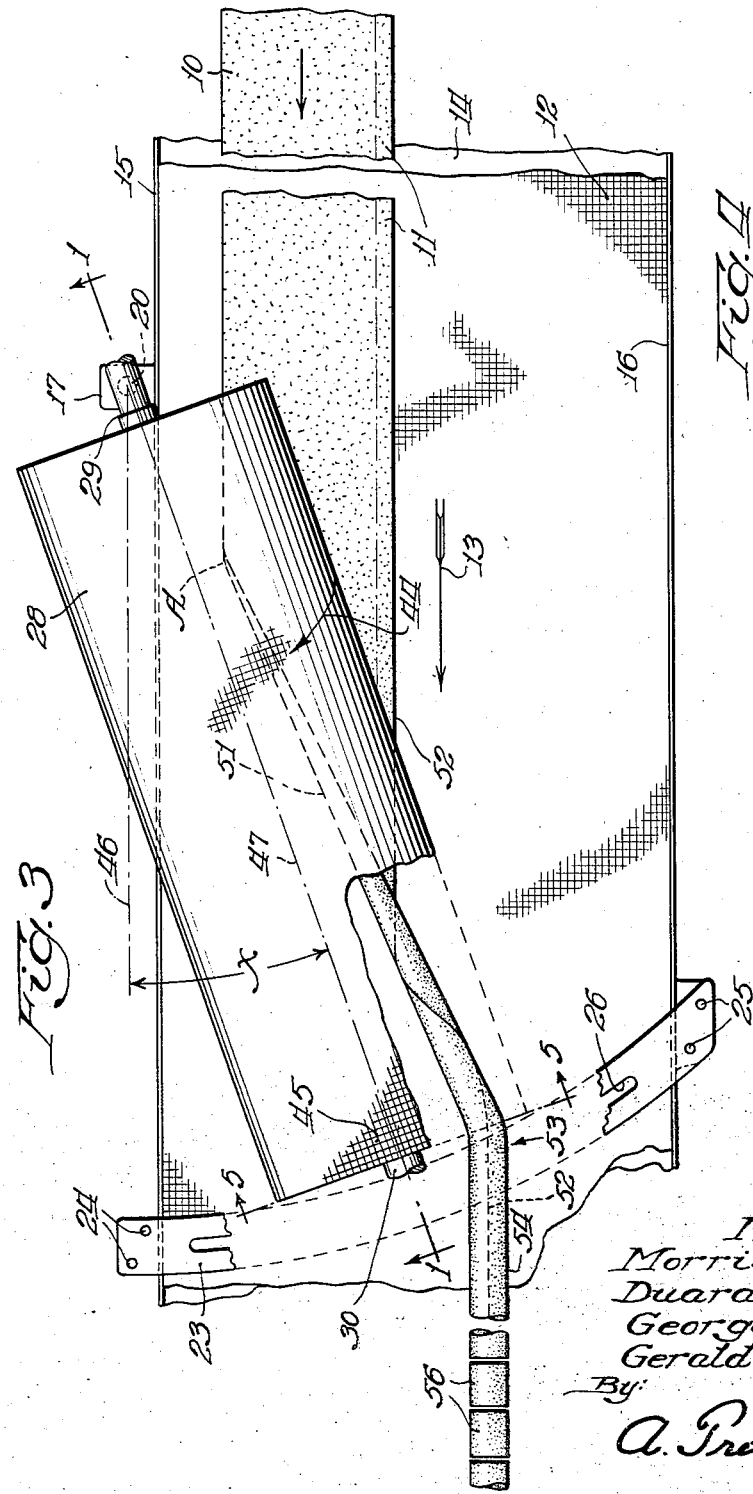
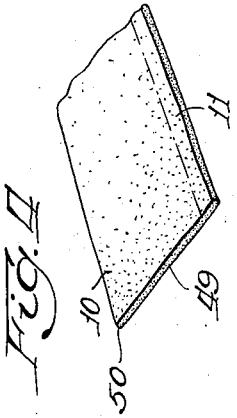
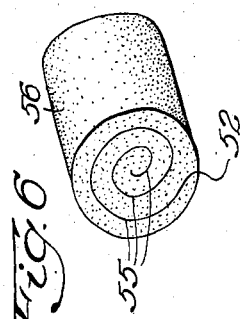
Inventors:
Morris Cohen
Duard W. Enoch
George Hasty and
Gerald A. Jorgenson
By: A. Trevor Jones
Atty.

Patented July 4, 1944

2,352,617

UNITED STATES PATENT OFFICE 2,352,617

METHOD OF TREATING DOUGH

Morris Cohen, Kansas City, Mo., and Duard W. Enoch, George Hasty, and Gerald A. Jorgenson, Chicago, Ill., assignors to Interstate Bakeries Corporation, Kansas City, Mo., a corporation of Delaware Application February 6, 1942, Serial No. 429,764

3 Claims. (Cl. 107—54)

This invention relates to method for treating dough, more particularly in large scale bakery production where savings in time and labor cost are important, and where, together with such savings, improvements in the quality of the product are sought.

See co-pending means application Serial No. 514,040, filed December 13, 1943, as a division hereof.

In the handling of dough for baking, it has been well known to move an elongate strip of dough along a conveyor belt and station a number of men, frequently as many as five or six, at intervals along the length of the belt to coil the strip longitudinally by hand, so that it is formed into a long relatively small diameter coiled cylinder having its axis extending in the direction of movement of the belt, whereupon the elongate cylinder may be cut by hand or by a power driven knife into short length cylindrical pieces to be placed in pans or the like for baking.

It has also been proposed to eliminate the manual rolling by the employment of mechanically driven rollers placed obliquely immediately over the conveyor belt to turn the dough upon itself in one or more convolutions. It has been found, however, that a minimum of working of the dough is desirable and that such coiling of the dough by a plurality of rollers has attendant disadvantages in the final results as well as necessitating more complicated mechanism at enhanced cost of installation and maintenance. The present invention aims to accomplish, with the use of one roller only engaging the dough, what has formerly been done by several men by hand, thus reducing the labor cost and at the same time eliminating manual handling of the dough with improved results in speed and continuity of operation and an improved and more uniform final product.

The invention is inclusive of both the process and the apparatus, and will be readily understood by reference to the accompanying drawings showing a preferred form of apparatus embodying the invention and illustrative process steps employed in the practice thereof.

In the drawings—

Figure 1 is a sectional view, partly in elevation, of such apparatus, being a section taken on the line 1—1 of Fig. 3;

Figure 2 is a partial end view or section taken on the line 2—2 of Fig. 1;

Figure 3 is a plan view of the structure shown in Figs. 1 and 2, together with a dough strip being treated;

Figure 4 is a fragmentary perspective view of the leading end of the dough strip;

Figure 5 is a somewhat diagrammatic end view or section taken on the line 5—5 of Fig. 3 showing both apparatus and treated dough; and Figure 6 is an enlarged perspective view of the dough piece ready for baking.

Referring in detail to the drawings, the dough 10 (Fig. 3) may be prepared in the usual way, advantageously by the use of dough conditioning machinery, not necessary, for the purposes of the present invention, to be here described, it being sufficient for present purposes to indicate that the dough 10 may be first considered for the purposes of the present invention in the form of an elongate continuous strip, the leading end of such continuous strip having an appearance as suggested in the perspective view of Fig. 4. Upon the upper surface of this strip of dough, as suggested in the drawings, and along one longitudinal margin thereof, as 11, may be deposited by means not here necessary to be described, a coating of water for sealing purposes presently further referred to.

The dough strip 10 is appropriately led onto a conveyor 12 here shown in the form of an endless canvas belt moving uniformly in the direction of the arrow 13 (by conventional conveyor belt mechanism not here shown) on a table 14 which includes side rails 15 and 16 for supporting the table and for guiding the belt therealong.

In accordance with the present invention, the side rail 15 carries a bracket 17 on which is pivotally supported one leg 18 of a frame 19 of inverted U-shape, the frame leg 18 having a cylindrical foot 20 received in a corresponding socket 21 in the bracket 17 to pivot the frame 19 thereon for swinging movement across the conveyor 12 in a plane parallel to the conveyor.

At its other end, the frame 19 has a somewhat shorter leg 22 which rides on an arcuate track 23 disposed transversely to span the conveyor belt 12 in relatively close proximity thereabove and fixed to suitable brackets carried by the side rails 15 and 16, as at 24 and 25 respectively. The arcuate track 23 is formed on an arc concentric with the pivot 20 and with a radius corresponding to the length of the frame 19, so that the swinging end of the frame is supported in its movements cross-wise of the conveyor on the pivot 20. Thus, the frame may be arranged obliquely with respect to the conveyor 12, and to fix its oblique position selectively the track 23 may be slotted longitudinally as at 26 substantially throughout its arcuate distance to pass therethrough a headed set-screw 27 which enters the leg 22 of the frame and may be either loosened to permit manual cross-wise adjustment of the frame or tightened to clamp the leg 22 to the rail 23 to maintain such selected adjustment.

Carried by the frame 19 and between the end legs 18 and 22 thereof is shown a relatively large roller 28 mounted on trunnions 29 and 30 at its ends respectively which are journalled in the frame. At the pivotal end of the frame 19, the roller trunnion 29 is shown extended as at 31 to have fixed thereon a sprocket wheel 32 upon which is entrained a drive chain 33 also in mesh with a sprocket 34 on the output shaft 35 of a speed reducer 36 which is coupled with a prime mover such as the electric motor 37, the electrical connections and control for which may be conventional and need not be here shown. The speed reducer 36 may be provided with a control lever 38 for varying the speed thereof as is well known in the art, and the speed may be further reduced by making the sprocket wheel 34 on the output shaft of the reducer substantially smaller than the sprocket wheel 32 on the roller trunnion. The motor 37 and the speed reducer 36 are conjunctively mounted on the web piece 39 of the frame 19 to move with the frame and thus be always in operative position regardless of the position of the roller obliquely of the conveyor.

At the swinging end of the frame, the trunnion 30 of the roller 28 may be journalled in a bearing block 40 which has sliding vertical movement in the frame leg 22, the latter being appropriately bifurcated for this purpose as best shown in Fig. 2. Passing threadedly as at 22a through the upper end of the leg 22 as here indicated is a threaded turn-screw 41 having its lower end swivelled in the bearing block 40 as at 42 and at its upper end provided with a hand wheel 43. Thus by manipulation of the hand wheel 43 the bearing block 40 may be raised or lowered in the frame leg 22 and the swinging end of the roller 28 may be angularly adjusted in a plane normal to the conveyor belt 12 in any position of the frame transversely of the belt.

The arrangement is such that the roller 28 rotates in the direction of the arrow 44 (Figs. 3 and 5). The roller desirably has a peripheral covering 45 advantageously of canvas similar to the canvas conveyor belt 12 which is thus moderately but not too smooth. The diameter of the roller 28 (in one instance, say, approximately 12 inches) is desirably greater than the width of the dough strip 10 (which may be, say, approximately 8 inches), and the dough strip 10 here shown is substantially narrower than the conveyor belt 12 (which may be, say, 24 inches wide) so that the dough strip carried by the conveyor 12 in the direction of the arrow 13, may be advanced initially along one side of the conveyor belt 12, namely the side nearest to the pivot of the roller, the dough having been previously so sheeted.

The angle of the roller, indicated by the letter X, in a plane parallel with the belt is preferably, for the arrangement here shown, approximately twenty degrees from a straight longitudinal position, as suggested by an imaginary line 46, to the axis of the roller, as suggested by an imaginary line 47. Thus the roller extends desirably more nearly in the direction of movement of the conveyor than at right angles thereto while at the same time extending entirely across the dough strip. In the plane normal to the conveyor belt the roller 28 is desirably adjusted so that its distal or swinging end is a little higher (say 3/8 inch) than its proximal or pivoted end, providing a graduated space 48 between the roller and belt at the distal end. Variations in these angles for purposes of the present invention will be later pointed out. The proximal end of the roller will be seen to be practically tangent with the belt 12, so that the dough strip cannot pass completely thereunder.

So constructed and arranged, when the leading edge 49 (Fig. 4) of the initially leading end of the dough strip 10 moves in the direction of the arrow 13 carried by the conveyor belt 12, it will engage the roller 28 first at the corner 50 of the strip which will pass partially under the roller 28 to a point say A just short of the greatest diameter of the roller. Thereupon it will begin to be turned up and coiled upon itself, by the combined action of the moving belt and rotating roller. It has been found in the practice of the present invention that the peripheral speed of the roller at its periphery where engaged by the dough is desirably greater than and substantially in excess of the linear speed of the conveyor with the dough thereon. For example, if the speed of the belt is approximately 40 feet per minute, the speed of the roller may well be say 18 revolutions per minute or a peripheral speed of approximately 55 feet per minute. Thus, as the dough strip begins to be coiled, by the joint action of the moving belt and rotating roller, and friction between the dough and the periphery of the roller, the coiled dough begins to rotate due to the greater speed of the roller and the fact that the surface of the roller is only moderately smooth. Consequently, the dough is coiled upon itself faster than it is moved longitudinally and a minimum of helical coiling occurs at the leading end of the dough strip. Such helical coiling is undesirable, and is practically eliminated by the present invention. If any portion of the leading end of the dough strip need be discarded for this reason, in the practice of the present invention, it is so small as to be negligible.

It will be understood from the foregoing that for a given run of production, the dough strip 10 may be continuous, and may be produced without a break practically indefinitely.

As the dough strip moves farther along in the direction of the arrow 13 sufficiently under the roller 28 to engage the roller, it is coiled throughout its width, intermediately in a tapered coil as indicated at 51 (Fig. 3). During this coiling of the dough strip an advantageous wedging action occurs due to the progressively increasing diameter of the intermediate coiled portion 51 of the strip which wedging action mildly but not too vigorously works the dough together somewhat. Accommodation for the increasing diameter of the dough as it is thus coiled is made by the graduated space 48 which may be increased or decreased (by manipulation of the hand wheel 43) as the width and thickness of the dough strip 10 may be varied. In this instance the dough strip 10 may be, say, approximately 1/4 inch thick initially, and the maximum diameter of the dough strip when coiled will in the proportions given for illustrative purposes, be approximately 1½ inches. Thus, the diameter of the roller 12 is desirably about eight times that of the dough as finally coiled.

It is to be borne in mind that as the dough is being coiled, for example at 51, it is rotating faster than it is moving forward, due to the periphery of the roller being not too smooth and thus transmitting at least some of its excess speed of rotation to the dough. As the dough cannot pass completely under the roller at the greatest diameter of the roller, the dough is thus displaced laterally on the belt, fast enough to minimize the production of a helical spiral in the coiled dough. It is desirable that the coiled dough strip should move laterally on the belt 12 as a resultant of the actions of the longitudinally moving belt and the rotatively moving roller, and it will be seen from Fig. 3 of the drawings that the dough strip as it emerges from underneath the roller 28 has been displaced laterally on the belt 12 toward the side of the belt opposite to that upon which the roller 28 is pivoted, slippage between roller and dough permitting this.

It has been found that the angle X of the roller may be adjusted, in practice after the initial position of the dough strip has been determined as it moves onto the belt 12 at the right hand side of Fig. 3, so that the longitudinal edge 52 of the dough strip, that is, the edge which is nearest the center line of the belt, makes one complete revolution under the influence of the roller 28, so as to displace this edge laterally of the conveyor belt to a position indicated at 53 in which the edge 52 is directly at the bottom of the coil as seen from Figs. 3 and 5, and the final wedging action as the dough coil emerges from under the roller 28 thus assists in sealing this otherwise free edge of the coil to the other spirals of the coil, which sealing action is assisted by the moistening of the margin 11 of the dough strip along this edge as already referred to. The fact that the dough is subject to the rotative action of the roller 28 while the edge 52 of the dough strip is being moved laterally to the position at 53 contributes further to the sealing action just referred to.

It has been found that with a dough strip as here shown a roller of approximately twelve-inch diameter provides the optimum of wedging action on the coiled dough cylinder 54 by reason of the somewhat angular space B (Fig. 5) which the coiled dough traverses between the belt 12 and the periphery of the roller 28 at the distal end of the roller. Progressive reduction of the diameter of the roller would rapidly diminish such wedging action while a progressive increase in the diameter, above, say, 12 inches, would only slightly increase such wedging action. As already explained, the provision for adjustment of the swinging end of the roller and adjustment also in a plane normal to the conveyor belt will accommodate normal or slight variations in the thickness of the dough strip. If a substantially thicker dough strip were desired to be employed, increasing materially the diameter of the finally coiled dough cylinder, a roller of larger diameter might well be employed, the proportions here suggested being illustrative. For such here shown illustrative proportions, the roller has a length of say 36 inches.

Furthermore, as the dough emerges from under the roller, under the continued advancing influence of the belt 12, the coiled dough cylinder 54 immediately ceases to rotate and the sealed edge 52 therefore remains at the bottom of the coil, as is highly desirable, for the purpose of maintaining this seal until it is set, by an interval of time, with the weight of the coil thereon, the coiled dough cylinder passing under the track 23.

Moreover, it will be seen that the coil as it emerges from under the roller is not in the form of a helix. In other words, as appears from Figs. 3 and 5, when the coiled dough emerges from under the roller, after the first few inches of the leading edge 49 of the dough strip 10 have gone by, the spirals 55 of the coiled dough are advantageously in the same transverse plane or describe what may be called a flat spiral and not a helical spiral.

Consequently, by the practice of the present invention, the dough cylinder 54, after it has passed the roller 28, may be immediately severed into short cylindrical sections 56, one of which is shown in perspective in Fig. 6. This severing may be done by, say, a power driven knife, for example, which need not be here specifically described. These cylindrical dough sections may then be placed in pans or trays to be later baked.

It is desirable to maintain the sealed edge 52 of the coil directly at the bottom of the coil, as shown, for the additional reason that the distal edge of the roller, as the coil leaves the roller, is thus prevented from contacting the edge 52 after the seal is once made, which contact might otherwise tend to re-open the seal. Furthermore, in severing the sections 56, as the knife is brought down upon the coil, here again, any tendency of the knife blade to re-open the seal is counteracted by the fact that the sealed edge is between the coil and the conveyor belt and is thus held against re-opening.

If the present invention be used for the making of rolls or buns in which sweetening or the like is spread upon the dough strip before it engages the roller, the convolutions or spirals 55 of the coil will of course remain apparent at the ends of the sections 56, this for example being indicated in Fig. 6, and this is of course not undesirable for say cinnamon buns or certain other classes of bakery products. If cinnamon rolls, for example, are being produced, the cylindrical sections 56 may be preferably shorter and even say of less length than their diameter, so as to be disposed on end in the baking pans.

On the other hand, if the invention be used to produce coiled dough sections without extraneous ingredients upon the dough strip, and say for bread, the convolutions or spirals of the coil will tend to disappear when the dough is treated in accordance with the present invention, so that advantageously when the coiled cylindrical sections are proofed and baked, the dough will become substantially homogeneous and a slice of such baked bread may be broken in half without the break tending to follow the original spirals. This is highly desirable when the invention is used for baking bread.

At the same time, the continuous treatment here described with its absence of manual handling of the dough and with a minimum of mechanical treatment of the dough, has been found to produce a lighter and more tender dough texture having more uniform size cells which enhances its edibility and digestibility, approaching more desirable characteristics of home-made bread.

In any use hereof, the continuity of the process and the reduction of manual labor involved contributes to a substantial reduction in cost.

Anti-friction bearings for the roller trunnions 29 and 30 in the frame 19 may be provided including self-aligning spherical bearing units 10b for the trunnion 29, and 40a for the trunnion 30. The spherical bearing unit 18b will rotate in the bearing blocks 18a of the leg 18 to accommodate raising or lowering of the bearing block 40 and, similarly, the spherical bearing 40a will rotate in the bearing block 40 to accommodate such angular adjustment.

Desirably the angle of the intermediate tapered coil 51 is, as shown, such that the axis of the coil is more nearly in the direction of movement of the dough strip 10 than it is transverse to such movement. Thus, when the angle X is of the order of twenty degrees, similarly the angle which the intermediate coil 51 makes with the direction of movement of the dough strip 10 is also advantageously of the order of twenty degrees. The point A varies somewhat, being generally nearer the greatest diameter of the roller when the leading corner 50 of the dough strip 10 initially engages the roller and then tending to travel backward somewhat as the strip is coiled upon itself, thus coiling the dough strip more nearly on its longitudinal axis.

The aspect of the invention claimed by the present case is the coiling of a strip of dough by a diagonal roller so as to bring the free edge of the coil at the bottom of the coil to seal this edge, claims to other aspects of the invention having been divided out as hereinbefore indicated.

Having described the invention, what is here claimed is:

1. The method of treating dough for baking which comprises the steps of moving an elongated strip of dough on a conveyor, causing the dough while moving on the conveyor to be engaged intermedially of its length by but not to pass completely under a rotating roller placed obliquely to the direction of movement of the dough, the periphery of the roller where engaged by the dough moving in a direction opposed to the direction of movement of the dough, whereby the strip of dough is coiled longitudinally, and adjusting the angle of the roller with respect to the dough strip so that the free edge of the dough is disposed at the bottom of the coil and between the coiled dough and the conveyor whereby to seal the free edge as it emerges from engagement with the roller.

2. The method of treating dough which comprises the steps of moving an elongated strip of dough on a conveyor, causing the dough while moving on the conveyor to be engaged intermedially of its length by but not to pass completely under a rotating roller placed obliquely to the direction of movement of the conveyor and extending substantially more nearly in the direction of movement of the conveyor than in a direction perpendicular thereto, rotating the roller at a peripheral speed substantially in excess of the linear speed of the conveyor, the periphery of the roller where engaged by the dough moving in a direction opposed to the direction of movement of the strip of dough, whereby the strip of dough is coiled on an axis extending more nearly in the direction of movement of the strip of dough as a whole than in a direction perpendicular thereto, adjusting the angle of the roller with respect to the strip of dough so that the free edge of the dough is disposed at the bottom of the coil and between the coiled dough and the conveyor whereby to seal the said free edge as the coiled strip emerges from engagement with the roller, and cutting the coiled strip into relatively small cylinders for baking.

3. The method of treating dough for baking which comprises the steps of relatively moving a flat strip of dough disposed on a support and a turn-up roller disposed obliquely to the dough strip more nearly in a direction longitudinal than at right angles to the dough strip to engage said dough strip intermedially of the length of the dough strip, rotating the roller whereby the periphery of the roller where engaged by the dough strip moves in a direction opposed to the direction of relative longitudinal movement of the dough strip and roller to turn up a longitudinal edge of the dough strip and to coil the dough strip longitudinally with said edge within the coil, and adjusting the angle of the roller with respect to the dough strip so that the other longitudinal edge of the coiled dough is disposed at the bottom of the coil and between the coiled dough and the support to seal the last mentioned edge after the dough is coiled by said roller.

MORRIS COHEN.
DUARD W. ENOCH.
GEORGE HASTY.
GERALD A. JORGENSON.